United States Patent [19]
Cray et al.

[11] Patent Number: 5,925,779
[45] Date of Patent: Jul. 20, 1999

[54] METHOD FOR PREPARING AMINOALKOXYSILOXANES

[75] Inventors: Stephen E. Cray, Vale of Glamorgan; Helen L. Gough, Rhondda Cynon Taff; Iain A. MacKinnon, Vale of Glamorgan, all of United Kingdom

[73] Assignee: Dow Corning, Ltd., Barry, United Kingdom

[21] Appl. No.: 09/102,523

[22] Filed: Jun. 22, 1998

[30] Foreign Application Priority Data

Jun. 25, 1997 [GB] United Kingdom .................... 9713283

[51] Int. Cl.$^6$ ........................................................ C07R 7/10
[52] U.S. Cl. ........................ 556/425; 427/377.2; 427/387; 427/389.9; 427/392; 427/394; 427/396
[58] Field of Search ........................ 556/425; 427/372.2, 427/387, 389.9, 392, 394, 396

[56] References Cited

U.S. PATENT DOCUMENTS 5,087,715   2/1992   Snow ................................. 556/419 X

FOREIGN PATENT DOCUMENTS 1720684   7/1967   Germany .

Primary Examiner—Paul F. Shaver
Attorney, Agent, or Firm—Timothy J. Troy

[57] ABSTRACT

A method for preparing an aminoalkoxysiloxane comprises reacting a siloxane having at least one Si—X bond with an aminoalcohol of the general formula HO—R—NR$^1{}_2$ and removing HX from the reaction mixture, wherein X is a hydrogen atom, an —OH group or an —OC(O)NR$^1{}_2$ group, R is a divalent substituted or unsubstituted alkylene or arylene group, and R$^1$ is a hydrogen atom or an alkyl group having from one to eighteen carbon atoms. The siloxane and aminoalcohol are preferably HO(Me$_2$SiO)$_{4.5}$H and ethanolamine, (Me$_3$SiO)$_2$MeSiH and ethanolamine, isopropanolamine or 3-aminopropan-1-ol, or Me$_3$SiO(Me$_2$SiO)$_3$(MeHSiO)$_5$SiMe$_3$ and isopropanolamine respectively. The aminoalkoxysiloxanes thus prepared are useful for treating textile fabrics.

11 Claims, No Drawings

METHOD FOR PREPARING AMINOALKOXYSILOXANES

The present invention relates to a method for preparing aminoalkoxysiloxanes.

The present inventors have identified aminoalkoxysiloxanes as alternatives to aminofunctional siloxanes for use as textile treating agents. A method of producing aminoalkoxysiloxanes is disclosed in German patent No. 1720684 which method comprises reacting an alkoxy terminated dimethylsiloxane with an aminoalcohol having a secondary alcohol group in the presence of a titanium containing catalyst. The resulting aminoalkoxysiloxanes are for use as polyurethane foam control agents.

Herein the term "aminoalkoxysiloxane" refers to a siloxane having at least one $\equiv$Si—OR—NR$^1{}_2$ bond wherein R and R$^1$ are as defined below.

According to the present invention there is provided a method for preparing an aminoalkoxysiloxane, which method comprises reacting a siloxane having at least one Si—X bond with an aminoalcohol of the general formula HO—R—NR$^1{}_2$ and removing HX from the reaction mixture, wherein X is a hydrogen atom, an —OH group, an —OC(O)R$^1$ group or an —OC(O)NR$^1{}_2$ group, R is a divalent substituted or unsubstituted alkylene or arylene group, and R$^1$ is a hydrogen atom or an alkyl group having from one to eighteen carbon atoms.

Preferred siloxanes for use in the present invention are those in which X is a hydrogen atom or an —OH group.

Suitable siloxanes for use in the present invention include those of the formula $[R^3SiO_{3/2}]_a[R^3{}_2SiO]_b[R^3{}_3SiO_{1/2}]_c$ wherein each group R$^3$ is independently selected from X groups and alkyl groups having from one to eight carbon atoms, with each siloxane molecule having at least one X group, and wherein a, b and c are integers. In general, lower molecular mass siloxanes are preferred in the method of the present invention over their higher molecular mass equivalents, with a+b+c in the above formula preferably being in the range 3 to 500.

Particularly preferred are siloxanes of the formula Me$_{(3-d)}$X$_d$SiO—[Me$_2$SiO]$_e$[MeXSiO]$_f$—SiX$_d$ Me$_{(3-d)}$, wherein each d is independantly in the range 0 to 3, e is in the range 0 to 300, f is in the range 0 to 300, d+f is at least 1, e+f is at least 1, X is a hydrogen atom or an —OH group, and Me represents a methyl group. Exemplified siloxanes for use in the present method include those of the formula HO(Me$_2$SiO)$_g$H wherein g is in the range 4 to 5, 9 to 12, or 45 to 55, Me$_3$SiO(Me$_2$SiO)$_3$(MeHSiO)$_5$SiMe$_3$ and Me$_3$SiO—(MeHSiO)$_h$—SiMe$_3$ wherein h is in the range 1 to 200.

In the aminoalcohols of the formula HO—R—NR$^1{}_2$ used in the method of the present invention, R is preferably an unsubstituted straight chain or branched alkylene group having from one to four carbon atoms, and R$^1$ is preferably a hydrogen atom. Particularly preferred aminoalcohols are ethanolamine, isopropanolamine and 3-aminopropan-1-ol. R may also be a divalent arylene group, for example the aminoalcohol may be p-aminophenol.

Preferred combinations of siloxane and aminoalcohol reagants for performing the present method include HO(Me$_2$SiO)$_{4.5}$H with ethanolamine, (Me$_3$SiO)$_2$MeSiH with ethanolamine, isopropanolamine or 3-aminopropan-1-ol, and Me$_3$SiO(Me$_2$SiO)$_3$(MeHSiO)$_5$SiMe$_3$ with isopropanolamine.

The method of the present invention may be performed with or without additional catalyst. The amino group of the aminoalcohol employed in the present method is basic and may itself sufficiently catalyse the reaction, i.e. the reaction may be autocatalytic. The presence of the basic amino group of the aminoalcohol may also result in homocondensation of low molecular weight siloxane reagants (e.g. degree of polymerisation 10 or less), i.e. the low molecular weight siloxane reagants react with themselves prior to reacting with the aminoalcohol. This homocondensation can result in product aminoalkoxysiloxanes having a degree of polymerisation which is greater than that of the siloxane from which they are produced, for example a degree of polymerisation up to four times greater. An absence of catalyst has the advantage that the step of removal or inactivation thereof is not necessary. However, a suitable catalyst may be employed in the present method if desired; for example, of those catalysts well known in the art, when X is a hydrogen atom a suitable catalyst is Pt on silica or Pd on carbon and when X is —OH a suitable catalyst is Ba(OH)$_2$.8H$_2$O. Typically, if employed the catalyst will be present in the reaction mixture in an amount of from 0.1 to 2.0% by weight.

In general, the reagants used in the present method, including any optional catalyst, may be simply mixed together, usually with heating and in a solvent. The order in which the reagants are mixed is not critical. The relative amounts of siloxane and aminoalcohol may be determined according to the desired degree of conversion of the siloxane Si—X bonds to aminoalkoxy groups; for example a stoichiometric excess of aminoalcohol may be employed if substantially all Si—X bonds are desired to be converted, or less than a stoichiometrically equivalent amount of aminoalcohol to siloxane may be employed if it is desirable for some Si—X bonds to remain (e.g. if subsequent polymerisation to higher molecular mass siloxanes is desired).

Removal of HX, as for example hydrogen gas, water, formic or acetic acid, from the reaction mixture is preferably performed continuously by conventional means, for example by azeotroping with toluene, by heating or by performing the reaction of the present method under reduced pressure. The reaction system involving the Si—X group containing siloxane, HX and the aminoalcohol which exists during the course of the present method is an equilibrium and hence removal of HX should move the equilibrium towards the desired aminoalkoxysiloxane product.

Lower molecular mass aminoalkoxysiloxanes produced by performing the present method can be used as intermediates for producing higher molecular mass aminoalkoxysiloxanes by employing conventional polymerisation techniques. The molar ratio of the reagants used in the present method may be controlled to ensure that some Si—X bonds remain in the aminoalkoxysiloxane product thereof, which may further undergo polymerisation reaction; for example, if Si—OH bonds remain in the aminoalkoxysiloxane product a higher molecular weight product may be obtained by condensation polymerisation with siloxane of the formula HO—(Me$_2$SiO)$_i$—H, in which i is in the range 4 to 5, 9 to 12, or 45 to 55 in the presence of a weakly basic catalyst, e.g. sodium phosphate.

Compositions comprising the product of the method of the present invention are useful in a number of applications, for example as coatings or finishes on various substrates. They may be formulated as solutions or emulsions and may be formulated so as to cure on a substrate to which they are applied. For example, they may be employed as a blend with other ingredients, for example polydimethylsiloxanes, or with materials commonly employed in coatings or finishes. The aminoalkoxysiloxanes are efficacious in the treatment of fibres, particularly natural fibres, for example new or freshly laundered textile fabrics consisting of or incorporating fibres of cotton, which may be blended with other fibres, for example polyester, to provide a finish which confers a good handle or feeling of softness.

Embodiments of the present invention will now be described in detail by way of example.

EXAMPLE 1

Ethanolamine (10.4 g, 0.17 mol), HO(Me$_2$SiO)$_{4.5}$H (60.0 g, 0.17 mol) and toluene (75 ml) were charged into a 250 ml flask and agitated to give a homogeneous, colourless solution. The mixture was then heated under reflux at 120$^{20}$ C.; water began to settle out of the mixture and was removed using Dean & Stark apparatus. Reflux was maintained until formation of water was no longer apparent. Toluene was removed by continuing to reflux whilst simultaneously draining the Dean & Stark apparatus. The siloxane product was set aside; $^{29}$Si NMR studies on the siloxane product showed that the degree of polymerisation had increased to approximately twelve and $^1$H and $^{13}$C NMR studies verified the presence of ≡SiOCH$_2$CH$_2$NH$_2$ endblocked siloxane.

EXAMPLE 2

The following reaction was separately performed with each of the aminoalcohols ethanolamine, isopropanolamine and 3-aminopropan-1-ol in turn.

0.15 mol of the aminoalcohol was dissolved in THF (40 ml) and (Me$_3$SiO)$_2$MeSiH (0.15 mol) was added at such a rate so as to keep the temperature of the mixture at or below 30° C. After complete addition of the (Me$_3$SiO)$_2$MeSiH the mixture was left stirring for one hour before sampling for gas chromatography. The extent of reaction was monitored by following the disappearance of the (Me$_3$SiO)$_2$MeSiH. If any of the (Me$_3$SiO)$_2$MeSiH was still present, the reaction mixture was heated to reflux (65° C.) until it had been consumed.

After the reaction was complete the solvent was removed under reduced pressure and the product purified by fractional distillation, also under reduced pressure. The structures of the products (Me$_3$SiO)$_2$MeSiOCH$_2$CH$_2$NH$_2$, (Me$_3$SiO)$_2$MeSiOCH(CH$_3$)CH$_2$NH$_2$ and (Me$_3$SiO)$_2$MeSiOCH$_2$CH$_2$CH$_2$NH$_2$ respectively from the aforementioned aminoalcohols were confirmed by $^1$H and $^{29}$Si NMR and mass spectrometry.

EXAMPLE 3

A mixture of 0.15 mol of Me$_3$SiO(Me$_2$SiO)$_3$(MeHSiO)$_5$SiMe$_3$ copolymer with 0.75 mol ethanolamine was prepared and heated to 100° C. for one hour. This mixture gelled, which is indicative of extensive reaction involving the formation of both Si—N and Si—O bonds. The reaction was repeated with two equivalents of ethanolamine per Si—H bond, with the ethanolamine added in small fractions. Copious foaming by release of H$_2$ was observed indicating the formation of ≡Si—OCH$_2$CH$_2$NH$_2$ groups.

That which is claimed is:

1. A method for preparing an aminoalkoxysiloxane, which method comprises reacting a siloxane having at least one Si—X bond with an aminoalcohol of the general formula HO—R—NR$^1{}_2$ and removing HX from the reaction mixture, wherein X is selected from the group consisting of a hydrogen atom, an —OH group and an —OC(O)NR$^1{}_2$ group, R is selected from the group consisting of divalent substituted and unsubstituted alkylene and arylene groups, and R$^1$ is selected from the group consisting of a hydrogen atom and an alkyl group having from one to eighteen carbon atoms.

2. A method according to claim 1 wherein X is selected from the group consisting of a hydrogen atom and an —OH group.

3. A method according to claim 1 wherein the siloxane is of the formula (R$^3$SiO$_{3/2}$)$_a$(R$^3{}_2$SiO)$_b$(R$^3{}_3$SiO$_{1/2}$)$_c$, each group R$^3$ being independently selected from the group consisting of X groups and alkyl groups having from one to eight carbon atoms, each siloxane molecule having at least one X group, and a, b and c are integers.

4. A method according to claim 3 wherein the siloxane is of the formula Me$_{(3-d)}$X$_d$SiO—(Me$_2$SiO)$_e$(MeXSiO)$_f$—SiX$_d$ Me$_{(3-d)}$, wherein each d is independently in the range 0 to 3, e is in the range 0 to 300, f is in the range 0 to 300, d+f is at least 1, e+f is at least 1, X is selected from the group consisting of a hydrogen atom and an —OH group, and Me represents a methyl group.

5. A method according to claim 4 wherein the siloxane is selected from the group consisting of (i) siloxanes of the formula HO(Me$_2$SiO)$_g$H wherein g is in a range selected from the group consisting of the ranges 4 to 5, 9 to 12, and 45 to 55, (ii) Me$_3$SiO(Me$_2$SiO)$_3$(MeHSiO)$_5$SiMe$_3$ and (iii) Me$_3$SiO—(MeHSiO)$_h$—SiMe$_3$ wherein h is in the range 1 to 200.

6. A method according to claim 1 wherein in the aminoalcohol of the general formula HO—R—NR$^1{}_2$ R is selected from the group consisting of unsubstituted straight chain and branched alkylene groups having from one to four carbon atoms and R$^1$ is a hydrogen atom.

7. A method according to claim 6 wherein the aminoalcohol is selected from the group consisting of ethanolamine, isopropanolamine and 3-aminopropan-1-ol.

8. A method according to claim 1 wherein the siloxane and aminoalcohol are selected from the group consisting of HO(Me$_2$SiO)$_{4.5}$H and ethanolamine respectively, and Me$_3$SiO(Me$_2$SiO)$_3$(MeHSiO)$_5$SiMe$_3$ and isopropanolamine respectively.

9. A method according to claim 1 wherein the siloxane is (Me$_3$SiO)$_2$MeSiH, and the aminoalcohol is selected from the group consisting of ethanolamine, isopropanolamine and 3-aminopropan-1-ol.

10. A method according to claim 1 which is performed in the absence of an additional catalyst.

11. A method for treating textile fabrics comprising:
(i) formulating an aminoalkoxysiloxane in a composition, wherein the aminoalkoxysiloxane is prepared by a method comprising forming a reaction mixture comprising a siloxane and an aminoalcohol, wherein the siloxane has at least one SiX bond and the aminoalcohol has general formula HO—R—NR$^1{}_2$; reacting the siloxane and the aminoalcohol; and removing HX from the reaction mixture, wherein X is selected from the group consisting of a hydrogen atom, an —OH group, and an —OC(O)NR$^1{}_2$ group, R is selected from the group consisting of divalent substituted and unsubstituted alkylene and arylene groups, and R$^1$ is selected from the group consisting of a hydrogen atom and an alkyl group having from one to eighteen carbon atoms, and wherein the composition is selected from the group consisting of solutions and emulsions;
(ii) applying the composition to the textile fabric; and
(iii) curing the composition.

* * * * *